United States Patent [19]

Negishi

[11] Patent Number: 4,667,876
[45] Date of Patent: May 26, 1987

[54] SYSTEM FOR HEATING INTERIOR SPACES OF ENGINE-DRIVEN VEHICLES

[75] Inventor: Shigeyuki Negishi, Miyashiro, Japan

[73] Assignee: Sanoh Kogyo Kabushiki Kaisha, Tokyo, Japan

[21] Appl. No.: 753,012

[22] Filed: Jul. 2, 1985

[30] Foreign Application Priority Data

Jan. 30, 1985 [JP] Japan ............................ 60-10546[U]

[51] Int. Cl.⁴ ............................................. B60H 1/02
[52] U.S. Cl. ................................. 237/12.3 A; 237/2 A
[58] Field of Search ............ 237/2 A, 12.3 A, 12.3 C, 237/12.3 B; 236/91 F; 165/104.11, 104.21, 104.22

[56] References Cited

U.S. PATENT DOCUMENTS 4,300,624 11/1981 Minning et al. ................. 165/104.22

FOREIGN PATENT DOCUMENTS 52-24617 2/1977 Japan .
2019616 10/1979 United Kingdom .............. 236/91 F Primary Examiner—Henry A. Bennet
Attorney, Agent, or Firm—Stevens, Davis, Miller & Mosher

[57] ABSTRACT

A heat pipe provided with a vaporizable working fluid is utilized to transfer heat from exhaust gas flowing through the exhaust pipe of an engine driving a vehicle to air flowing through an air duct to an interior space to be heated in the vehicle. The heat pipe has a loop return pipe for returning condensed fluid to a heat absorption part of the heat pipe and a control valve in the return pipe for controlling the flow of returning fluid, the control valve being controllable manually or automatically by a temperature control system including a sensor in the air duct, a control circuit, and a solenoid valve actuator.

7 Claims, 12 Drawing Figures

SYSTEM FOR HEATING INTERIOR SPACES OF ENGINE-DRIVEN VEHICLES

BACKGROUND OF THE INVENTION

This invention relates generally to heating of spaces in the interior of engine-driven vehicles and more particularly to a system for such heating in which a heat pipe is used to utilize the heat in the exhaust gas of the engine.

While the heating system of this invention is applicable principally to the heating of the interiors of motor vehicles or automobiles, it is not necessarily so limited, being applicable to other engine-driven vehicles such as small to medium size sea craft such as ferry boats, fishing boats, and recreational sea craft and certain aircraft.

Among such heating systems known heretofore which are adapted to heat interior spaces of vehicles by utilizing the heat in the engine exhaust gas of the vehicles, there is a system in which the heat absorption part of the heat pipe is installed within the exhaust pipe of the engine, and the heat discharge part of the heat pipe is installed within a heating air duct for conducting heating air to the space to be heated, the heat of the exhaust gas being transmitted to the heating air in the air duct by way of the heat pipe (as disclosed in Japanese Patent Laid-Open Publication (Kokai) No. 24617/1977).

In a known heating system of this character, however, since a control means is not provided, control of the degree of space heating and ON-OFF control cannot be carried out.

SUMMARY OF THE INVENTION

In view of the above described circumstances in the prior art, this invention contemplates the provision of a system for heating vechicle interior spaces which is capable of efficiently heating with the use of a heat pipe and, moreover, is capable of readily carrying out control of the temperature of vehicle interiors such as control of the degree or rate of heating or "ON-OFF" control.

According to this invention, briefly summarized, there is provided a system for heating the interior space of an engine-driven vehicle having an engine exhaust gas pipe, said system comprising: an air duct connected at a downstream end thereof to said interior space; an air-propelling means for propelling air through the air duct into the interior space; and a heat pipe comprising a heat absorption part adapted to absorb heat from engine exhaust gas flowing through said exhaust gas pipe, a heat discharge part disposed within the air duct and functioning to transfer heat to said air in the air duct, a vapor passage pipe connected at one end thereof to the heat absorption part and at the other end thereof to the heat discharge part, a working liquid sump disposed below, and communicating with the heat discharge part, a working liquid return pipe connected at one end thereof to said sump and at the other end thereof to a part of the vapor passage pipe near the heat absorption part, and control valve means installed in an intermediate part of said return pipe, a working fluid being enclosed in sealed state within the heat pipe and performing the operation of absorbing heat in the heat absorption part to vaporize, flowing as a vapor through the vapor passage pipe to the heat discharge part, discharging heat to the air in the air duct to condense into liquid form and flowing into the sump, and returning through the working liquid return pipe to the heat absorption part, the control valve means being operable to control the return flow of the working fluid.

The nature and utility of this invention will be more clearly apparent from the following detailed description when read in conjunction with the accompanying drawings, briefly described below.

DETAILED DESCRIPTION OF THE INVENTION

Figure 1:
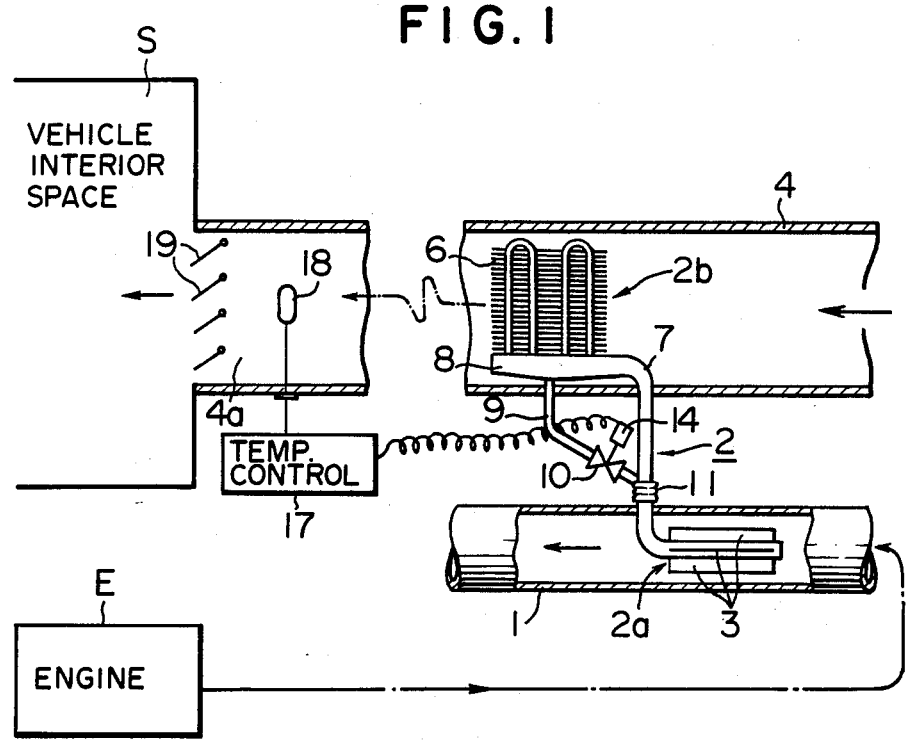
FIG. 1 is a schematic diagram, in said view with parts cut away, showing the essential parts of one example of the vehicle interior space heating system according to this invention.

As mentioned briefly in the foregoing summary, and as illustrated schematically in FIG. 1, the principal component of the space heating system according to this invention is a heat pipe 2 comprising a heat intake or absorption part 2a installed within an exhaust pipe 1 for exhausting the combustion gas from the engine E of a vehicle, a heat discharge part 2b installed within a heating air duct 4 and having a working liquid sump 8 at its bottom, a vapor passage pipe 7 connecting the heat absorption part 2a and the heat discharge part 2b, a working liquid return pipe 9 connecting the bottom of the sump 8 and a part of the vapor passage pipe 7 near the outer part of the exhaust pipe 1, a control valve mechanism 10, which is a solenoid valve in the illustrated embodiment and is installed in an intermediate part of the working liquid return pipe 9, and a working fluid contained in sealed-in state within the heat pipe. 2. The working fluid is a liquid such as water. When the working fluid is water, an agent for preventing freezing thereof may be added thereto. Any of the alcohols including glycols can be used as such an agent depending upon the atmospheric temperature.

Figure 2:
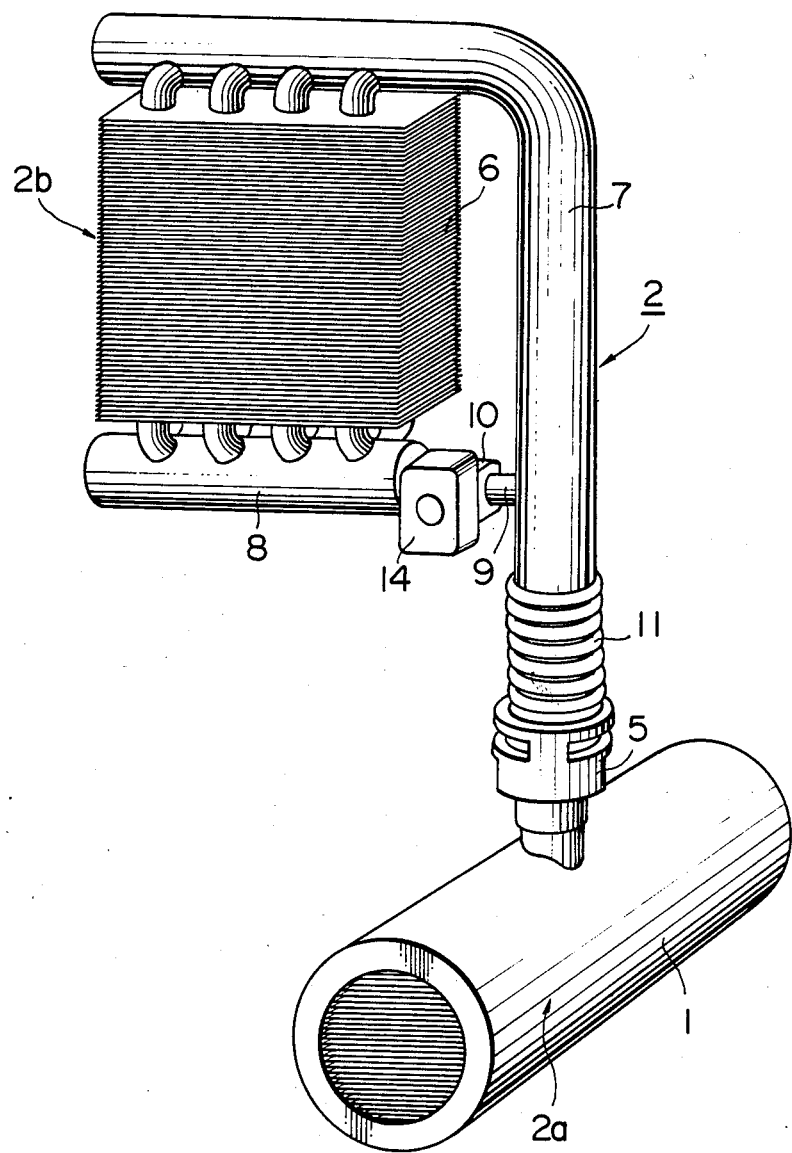
FIG. 2 is a fragmentary perspective view showing a modification of the system of FIG. 1.

At its part where the vapor passage pipe 7 enters the exhaust pipe 1, it is connected to the wall of the exhaust pipe 1 by way of a flexible bellows member 11 for absorbing vibrations of the exhaust pipe 1 and thereby preventing their being transmitted to the vapor passage pipe 7 and the working liquid return pipe 9. A pipe coupling 5 may be provided adjacent to the bellow member 11 as illustrated in FIG. 2 to enable easy and quick attachment and detachment of the pipe 7 to and from the pipe portion of the heat absorption part 2a. The heat absorption part 2a is provided on its outer surface with fins 3 for increasing its outer surface area thereby to improve its heat absorption efficiency. The heat discharge part 2b is also provided with a large number of cooling fins 6. The downstream end 4a of the heating air duct 4 communicates with the vehicle interior space S to supply heated air thereinto. The flow rate of the heated air thus supplied may be controlled by means such as damper means 19.

In the operation of space heating system having the above described essential construction and arrangement, the working fluid in the heat absorption part 2a undergoes heat exchange with the hot exhaust gas flowing through the exhaust pipe 1. That is, the working fluid is heated by heat absorbed from the exhaust gas and is vaporized. The resulting vapor rises through the vapor passage pipe 7 and enters the heat discharge part 2b, where the vapor gives up heat to the heating air flowing in the air duct 4 and condenses. The condensed working fluid flows downward and is collected in the working liquid sump 8. This fluid further flows downward through the working liquid return pipe 9 to return to the peripheral part of the heat absorption part 2a. The operation of the heat pipe 2 is a continuous repetition of the above described cyclic process except when the flow of the working liquid through the return pipe 9 is stopped by the control valve mechanism 10 as described hereinafter.

The heating air thus heated in the air duct 4 by the heat discharged by the working fluid in the heat discharge part 2b flows into the vehicle interior space S and heats the same. At least one portion of the air in the space S thus warmed may be circulated via a return duct (not shown) back to the upstream end of the heating air duct 4.

Figure 3:
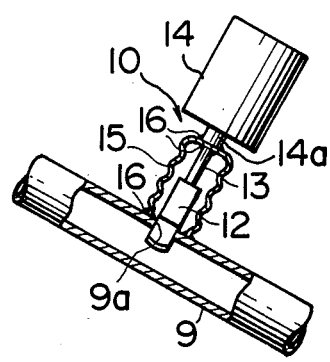
FIGS. 3 and 4 are side views of a control valve mechanism controllably operated by a solenoid valve to actuate a gating valve member, said views respectively showing the gating member in opened state and in fully closed state.
Figure 4:
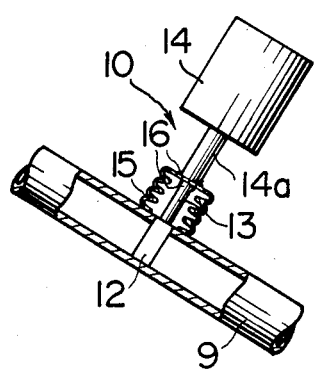

One example of the control valve mechanism 10, which is operable to control the flow rate of the condensed working liquid returning through the working liquid return pipe 9 to the heat absorption part 2a of the heat pipe 2, will now be described in greater detail. As shown in FIGS. 3 and 4, the control valve mechanism 10 in the illustrated embodiment has a gating member 12 which can be thrust directly into and retracted from the interior of the working liquid return pipe 9, in a direction substantially perpendicular to the axis thereof, through a cutout part 9a in the wall thereof.

The gating member 12 is actuated to undergo the above described movement by the armature or plunger 14a of a solenoid 14 by way of a stem 13 fixed at one end thereof to the outer end of the plunger 14a and at the other end to the gating member 12. The solenoid 14 is supported by support means (not shown) in a fixed state relative to the return pipe 9 and operates in response to control signals from a temperature control circuit 17 (FIG. 1) activated by the temperature within the downstream exit end 4a of the heating air duct 4 as measured by a temperature sensor 18.

Referring again to FIGS. 3 and 4, the stem 13 of the control valve mechanism 10 and a portion of the gating member 12 are enclosed and airtightly sealed within a bellows envelope 15, which is secured at its two ends by brazing 16 respectively to the joint between the plunger 14a and the stem 13 and to the outer surface of the return pipe 9 around the cutout part 9a This bellows envelope 15 is compressed and expanded in unison with the thrusting and retracting action of the plunger 14a, that is, with the closing and opening action of the gating member 12, thereby continually sealing the interior of the return pipe 9 from the outside atmosphere irrespective of the operation of the control valve mechanism 10.

In the foregoing embodiment, the heat absorption part 2a of the heat pipe 2 is a tube of a certain length extending coaxially within the exhaust pipe 1 and provided on its external surface with fins 3 for increasing its heat absorbing area. The heat absorption part 2a, however, may take a number of other forms, examples of which will now be described with references to FIGS. 5A through FIG. 9. In all cases, the heat absorption part 2a is essentially a heat exchanger in which heat in the exhaust gas EG is transferred to the working fluid WF without direct contact therebetween.

Figure 5A:
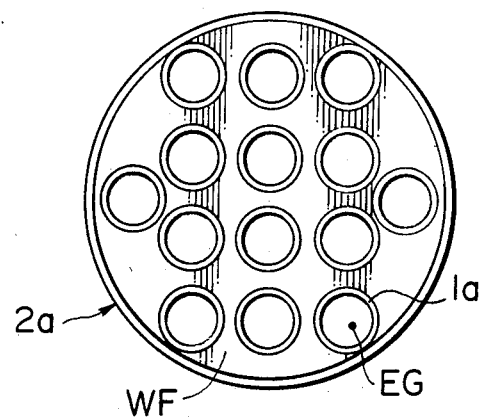
FIGS. 5A and 5B are respectively end and side views of a specific form of the heat absorption part of a heat pipe serving as a heat exchanger.
Figure 5B:
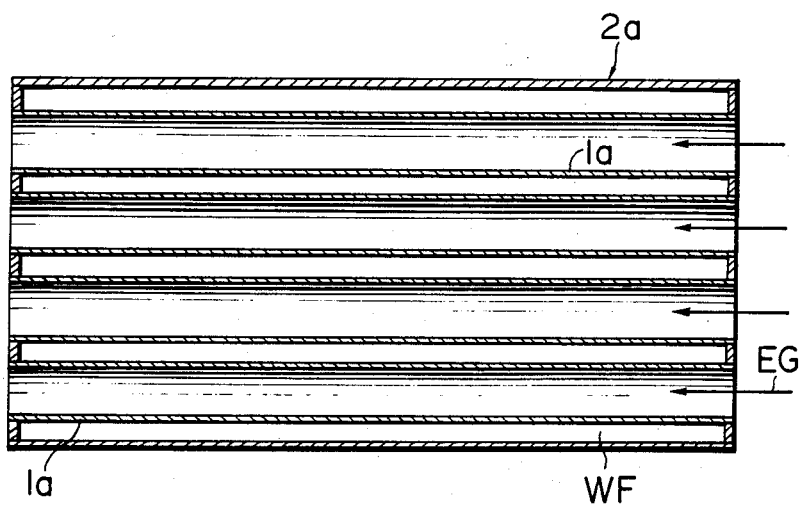

In the example illustrated in FIGS. 5A and 5B, the heat absorption part 2a is in the form of a cylinder enclosing a number of exhaust gas conducting tubes 1a which are spaced apart from each other and from the enclosing cylinder and extend parallelly to the longitudinal axis of the cylinder. These tubes 1a are communicatively connected to an intermediate part of the engine exhaust pipe 1 and conduct therewithin the exhaust gas EG. The space mutually between the tubes 1a and between the tubes 1a and the cylinder contains the working fluid WF.

Figure 6A:
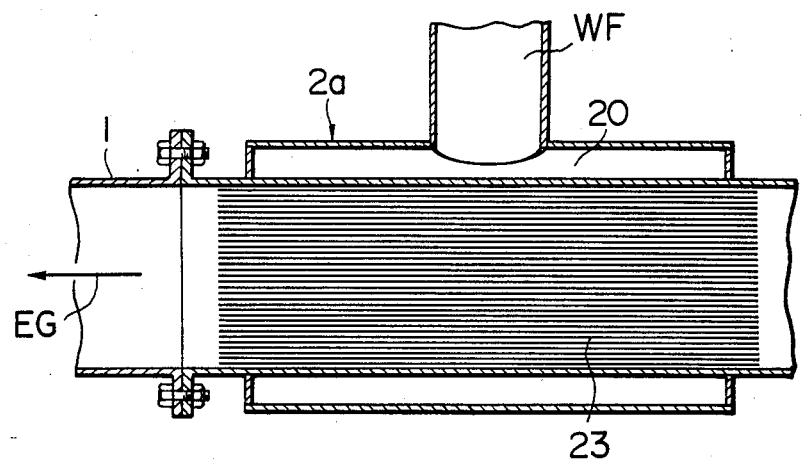
FIGS. 6A and 6B are respectively side and end views showing another specific form of the heat absorption part.
Figure 6B:
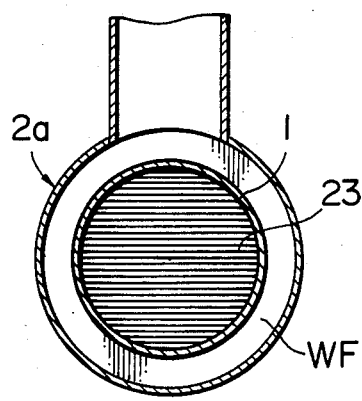
Figure 7:
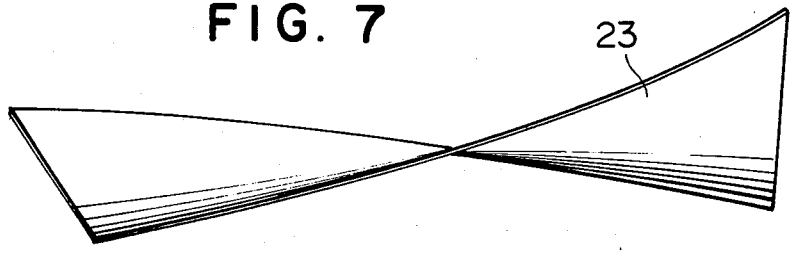
FIG. 7 is a side view of a twisted fin used in the heat absorption part shown in FIGS. 6A and 6B.

In the example shown in FIGS. 6A and 6B, a part of the engine exhaust pipe 1 is enclosed coaxially in a cylinder. The inner diameter of this cylinder is greater than the outer diameter of the exhaust pipe 1, whereby an annular space 20 is formed therebetween to contain the working fluid WF. The interior of the exhaust pipe 1, at its part thus encompassed by the cylinder, is filled with fins 23 for increasing the heat transmission area. The hot exhaust gas EG is thus caused to flow between these fins 23. In one example of this construction, the fins 23 are twisted as indicated in FIG. 7.

Figure 8A:
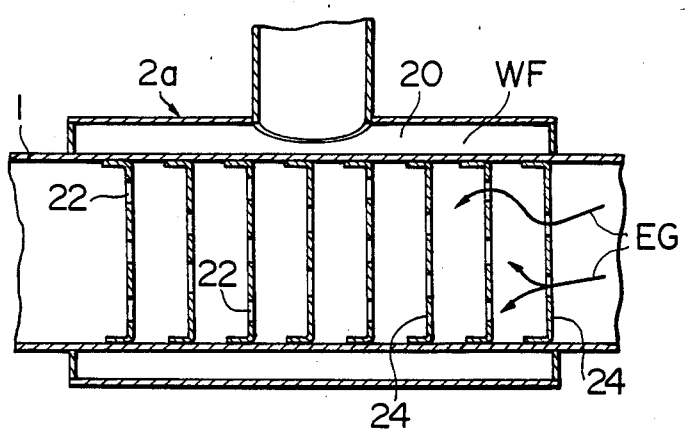
FIGS. 8A and 8B are respectively a side view and an end view showing still another example of the heat absorption part.
Figure 8B:
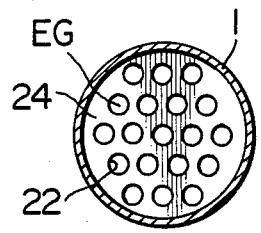

In still another example as shown in FIGS. 8A and 8B, the structural configuration of the engine exhaust pipe 1 and the cylinder is the same as that in the example shown in FIG. 6, but the interior of the exhaust pipe 1, at its part encompassed by the cylinder, is provided with perforated transverse baffle plates 24, which are fixed around their peripheries to the inner wall surface of the exhaust pipe 1 and are spaced apart in the axial direction of the exhaust pipe 1. The positions of the perforations or passage holes 22 in adjacent baffle plates are staggered, whereby the exhaust gas EG is caused to flow turbulently through these holes in undulating paths. Examples of the patterns of the holes in the baffle plates 24 are shown in FIG. 8B. The heat exchange rate is thereby increased by the increased heat absorption area and by the turbulent flow of the hot exhaust gas EG.

Figure 9:
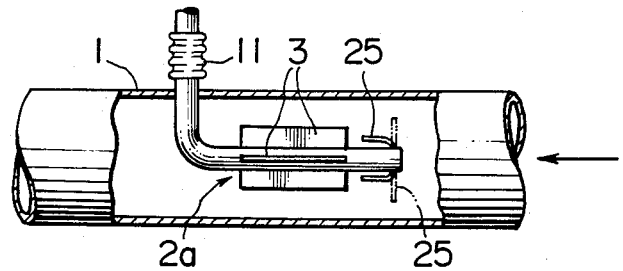
FIG. 9 is a side view, with parts cut away, showing a heat absorption part provided with a flow guide member for automatic control of the heat exchange rate.

The heat absorption part 2a of the heat pipe 2 of the constitution shown in FIG. 1 can be additionally provided at its upstream end with a flow guide member 25 made of shape memory alloy or bimetal as shown in FIG. 9. This guide member 25 is normally in a state wherein it is closely hugging the end of the tube of heat absorption part 2a as indicated by solid line, and wherein it has little influence on the exhaust gas flow. Then, as the exhaust gas temperature rises, the guide member 25 automatically opens outwardly as indicated by intermittent line and thereby guides the exhaust gas away from the tubular part of the heat absorption part 2a and its fins 3. As a result, the heat absorption rate, and therefore the heat exchange rate, are lowered. Thus a temperature control means, in addition to the control means comprising the temperature sensor 18, the temperature controller 17, the solenoid 14, and the control valve mechanism 10, is provided to compensate for excessively high temperature of the exhaust gas.

When, in the operation of the space heating system of this invention in one embodiment thereof, the temperature within the downstream exit end 4a of the air duct 4, as sensed by the temperature sensor 18, reaches or slightly exceeds the upper limit of a temperature range which has been preset in the temperature controller 7, the controller 17 operates responsively to transmit a control signal to the solenoid 14. The solenoid thereupon operates as described hereinbefore to close the gating member 12 to its fully closed state as shown in FIG. 4.

When the control valve mechanism 10 is thus fully closed, the working fluid which has condensed in the heat discharge part 2b no longer returns to the heat absorption part 2a of the heat pipe 2, which thereby assumes a so-called "dry-out" state. Thus heat exchange by the heat pipe 2 stops.

When this heat exchange thus stops, the temperature within the vehicle interior space S and the air duct 4 progressively become lower. When the temperature within the duct 4 as sensed by the sensor 18 drops below the lower limit of the above mentioned preset range, the controller 17 operates to activate the solenoid 14, which thereupon opens the gating member 12. The working fluid is thereby released, whereby heat exchange by the heat pipe 2 is resumed.

Thus, by the use of a heat pipe 2, the heat possessed by the exhaust gas flowing through the exhaust pipe 1 can be transferred with high efficiency to the air flowing through the air duct 4.

Furthermore, since a control valve mechanism is provided in the working liquid return pipe 9 of the heat pipe 2 to control the return flow rate of the condensed fluid to the heat absorption part 2a, control of the heating temperature in the vehicle interior S, which could not be easily accomplished heretofore, is made readily possible.

As mentioned hereinbefore, another feature of this invention is the provision of the vibration absorbing bellows 11, by which vibrations on the engine exhaust pipe 1 are absorbed and prevented from being transmitted via the heat pipe 2 to the air duct 4. This bellows 11 further serves to absorb strains and deformations due to differential thermal expansions.

Still another advantageous feature of this invention is the provision of the bellows envelope 15 to cover and seal the moving parts of the control valve mechanism 10, which is thereby made positively gas tight. Accordingly, there is no possibility of a noncondensing gas infiltrating into the interior of the heat pipe 2, the serviceable life of which and the entire space heating system can thereby be prolonged.

The control of the control valve mechanism 10 thereby to control the temperature in the vehicle interior space S through the temperature control system comprising the temperature sensor 18, the control circuit 17, and the solenoid 14 can be accomplished in an "ON-OFF" manner between upper and lower limits preset in the temperature controller 17 as described hereinbefore. Alternatively, this temperature control can be carried in a more finely graduated manner or in a freely variable manner. Furthermore, the control valve mechanism 10 need not be driven by a solenoid 14 as in the illustrated embodiment, it being possible to utilized other actuating means, such as a pneumatic or hydraulic cylinder-piston actuator or a motor, to actuate the gating member 12. It will be obvious that the control valve mechanism 10 can be manually actuated.

By the use of a heat pipe in the space heating system in accordance with this invention, the heat exchange between the engine exhaust gas EG in the exhaust pipe 1 and the heating air in the air duct 4 by way of the working fluid WF can be accomplished efficiently, whereby the vehicle interior space S can be heated rapidly, even at the time of starting of the engine.

What is claimed is:

1. A system for heating the interior space of an engine-driven vehicle having an engine exhaust gas pipe, said system comprising: an air duct connected at a downstream end thereof to said interior space; an air-propelling means for propelling air through the air duct into the interior space; and a heat pipe comprising a heat absorption part adapted to absorb heat from engine exhaust gas flowing through said exhaust gas pipe, a heat discharge part disposed within the air duct and functioning to transfer heat to said air in the air duct, a vapor passage pipe connected at one end thereof to the heat absorption part and at the other end thereof to the heat discharge part, a working liquid sump disposed below said heat discharge part and communicating with the heat discharge part, a working liquid return pipe connected at one end thereof to said sump and at the other end thereof to a part of the vapor passage pipe near the heat absorption part, control valve means installed in an intermediate part of said return pipe, a working fluid being enclosed in sealed state within the heat pipe and performing the operation of absorbing heat in the heat absorption part to vaporize, flowing as a vapor through the vapor passage pipe to the heat discharge pipe, discharging heat to the air in the air duct to condense into liquid form and flowing into the sump, and returning through the working liquid return pipe to the heat absorption part, the control valve means being operable to control the return flow of the working fluid, and a bellows member provided in said vapor passage pipe adjacent to the outer wall of the exhaust gas pipe to absorb vibrations of the exhaust gas pipe and prevent the vibrations from being transmitted to the vapor passage pipe.

2. A system for heating the interior space of an engine-driven vehicle having an engine exhaust gas pipe, said system comprising: an air duct connected at a downstream end thereof to said interior space; an air-propelling means for propelling air through the air duct into the interior space; and a heat pipe comprising a heat absorption part adapted to absorb heat from engine exhaust gas flowing through said exhaust gas pipe, a heat discharge part disposed within the air duct and functioning to transfer heat to said air in the air duct, a vapor passage pipe connected at one end thereof to the heat discharge part, a working liquid sump disposed below said heat discharge part and communicating with the heat discharge part, a working liquid return pipe connected at one end thereof to said sump and at the other thereof to a part of the vapor passage pipe near the heat absorption part, and control valve means installed in an intermediate part of said return pipe, a working fluid being enclosed in sealed state within the heat pipe and performing the operation of absorbing heat in the heat absorption part to vaporize, flowing as a vapor through the vapor passage pipe to the heat discharge part, discharging heat to the air in the air duct to condense into liquid form and flowing into the sump, and returning through the working liquid return pipe to the heat absorption part, the control valve means being operable to control the return flow of the working fluid, said heat absorption part being a tube disposed coaxially within said exhaust gas pipe and being bent at one end thereof to extend out through the wall of the exhaust gas pipe, the end thus extending out being connected to said one end of the vapor passage pipe, said tube being provided along the outer surface thereof in the longitudinal direction thereof with a plurality of heat absorbing fins and being provided at the other end thereof with a flow guide member which is changeable in shape in response to temperature change, said flow guide member being normally in a state wherein it is closely hugging said other end of the tube but opening outwardly with increasing exhaust gas temperature to guide the gas to flow away from the tube and thereby to lower the heat exchange rate.

3. A system as claimed in claim 1 in which the control valve means comprises: a gating member which can be thrust into and retracted out of the working liquid return pipe through a cut-out aperture in the wall thereof, thereby to perform valving action to close and open the liquid flow passage through said return pipe; motive power means for actuating the gating member to undergo said valving action; and a gas-tight bellows envelope for sealingly enclosing moving parts of the gating member, whereby the interior of said return pipe is sealed off from the outside atmosphere.

4. A system as claimed in claim 1 in which the heat absorption part comprises a cylinder with end walls and a plurality of tubes extending through the cylinder parallel to the axis of the cylinder and through the end walls and connected at the ends thereof to the exhaust gas pipe to form an intermediate part of the exhaust gas pipe, the tubes being spaced apart from each other and from the inner wall surface of the cylinder, and the space between the tubes and the cylinder containing the working fluid and communicating with the vapor passage pipe.

5. A system as claimed in claim 1 in which the heat absorption part comprises a cylinder with closed ends coaxially encompassing a portion of the exhaust gas pipe with an annular space therebetween and a plurality of fins fixed in mutually spaced-apart state within the exhaust gas pipe in said portion thereby to increase the heat exchange surface area, and said annular space contains the working fluid and communicates with the vapor passage pipe.

6. A system as claimed in claim 5 in which said fins are twisted.

7. A system as claimed in claim 1 in which the heat absorption part comprises a cylinder with closed ends coaxially encompassing a portion of the exhaust gas pipe with an annular space therebetween and a plurality of baffle structures fixed to the inner wall surface of the exhaust gas pipe in said portion and functioning to increase the heat exchange surface area and to cause the exhaust gas to flow turbulently thereby to increase the heat exchange effect.

* * * * *

UNITED STATES PATENT AND TRADEMARK OFFICE
CERTIFICATE OF CORRECTION

PATENT NO. : 4,667,876

DATED : May 26, 1987

INVENTOR(S) : Shigeuki NEGISHI, et al

It is certified that error appears in the above-identified patent and that said Letters Patent is hereby corrected as shown below:

Title page, Item (19) "Negishi" should read --Negishi et al--

In Column 1:

[75] should read:

--Inventors: Shigeyuki Negishi, Miyashiro-Machi; Kouichi Satake, Koga, both of Japan--

Signed and Sealed this

First Day of September, 1987

Attest:

DONALD J. QUIGG

Attesting Officer

Commissioner of Patents and Trademarks